J. MORE.
Apparatus for Molding Bung-Bushes.

No. 133,592.  Patented Dec. 3, 1872.

UNITED STATES PATENT OFFICE.

JAMES MORE, OF NEW YORK, N. Y.

IMPROVEMENT IN APPARATUS FOR MOLDING BUNG-BUSHES.

Specification forming part of Letters Patent No. 133,592, dated December 3, 1872.

*To all whom it may concern:*

Figure 1:
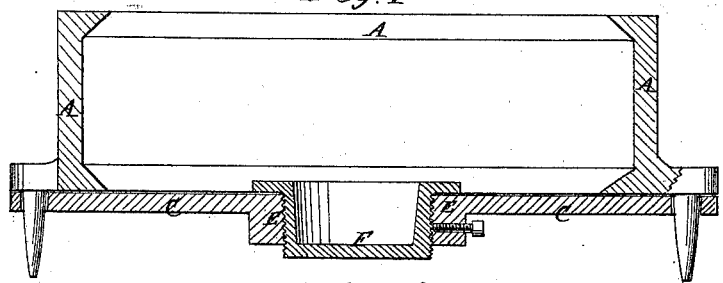
Figure 2:
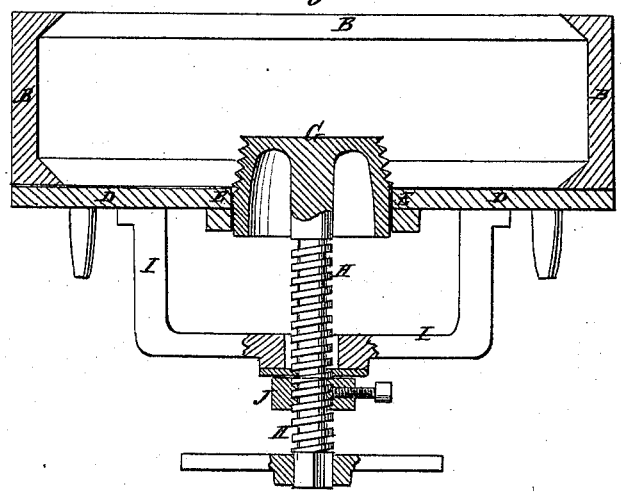
Figure 3:
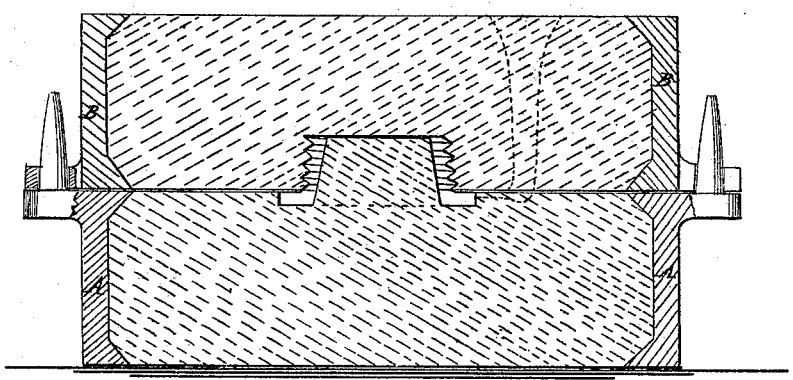

Be it known that I, JAMES MORE, of the city, county, and State of New York, have invented a new and useful Improvement in Apparatus for Molding Bung-Bushes, of which the following is a specification:

Figure 1 is a detail cross-section of the match-plate, pattern, and flask, for forming the core and flange recess of the sand-mold. Fig. 2 is a detail cross-section of the match-plate, pattern, leading-screw, and its attachments for forming the screw recess or cup of the sand-mold. Fig. 3 is a detail cross-section of the flask filled and ready for casting.

Similar letters of reference indicate corresponding parts.

My invention has for its object to furnish an improved apparatus for molding bushes for the bungs of casks and other vessels, said bushes being made with a wood screw-thread upon their outer surfaces, to enable them to be screwed into the bung-hole, and which shall be simple in construction and convenient in use; and it consists in the employment, in molding bung-bushes, of leading-screws for withdrawing the screw-patterns from the sand, and in the employment of match-plates for molding the screws and the cores and flanges of bung-bushes concentrically in two half-flasks, as hereinafter more fully described.

A and B are the half-flasks, which are constructed and provided with lugs, guide-pins, and guide-holes, in the ordinary manner. C D are two iron match-plates, each of exactly the same size and form as the other, and both of such a size as to fit upon the half-flasks A B, in connection with which they are to be used. One of the match-plates C D is provided with lugs and guide-holes, and the other with lugs and guide-pins, corresponding with the guide-pins and guide-holes of the half-flasks A B, in connection with which the said match-plates are to be used. In each of the match-plates are formed holes E, one or more. The holes E must be exactly alike in position in the two plates, and of exactly the same diameter, and are intended to receive the patterns F G which mold the bushes. In the holes E of the one plate, as C, are fitted the patterns F, which mold the core and flange, or the internal surface of the bushes; and in the other plate, as D, are fitted the patterns G, which mold the screw, or external surface of the bushes. The screw-patterns G are provided with leading-screws H, formed solidly upon or rigidly attached to them. The thread of the leading-screw H is made of exactly the same pitch as the wood screw-thread of the pattern G, so that the said pattern may be turned out of the sand by turning the said leading-screw. The leading-screw H passes through a screw-hole in a suitable bracket or bridge, I, attached to or formed upon the match-plate D, and is turned by means of a crank or other convenient handle applied to its outer end. The leading-screw H is provided with a screw-collar, J, adjustably secured in place by a set-screw, which, by striking against the bracket or bridge I, stops the pattern G at exactly the required point. The half-flasks, with the match-plates and patterns applied to them, are packed with sand in the ordinary manner, and when the match-plates and patterns are removed in the one half-flask there will be found the flange molded beneath the surface of the parting and the core projecting above said surface; and in the other half-flask will be found molded the screw-mold for the outer surface of the bush. When the two half-flasks are put together the core will enter the screw-mold concentrically, leaving sufficient space around said core for the desired thickness of metal in the bush, thus forming the complete mold. Any desired kind of gates may be formed in the ordinary manner.

Having thus described my invention, I claim as new and desire to secure by Letters Patent—

1. The employment, in molding bung-bushes, of leading-screws H for withdrawing the screw-patterns G from the sand, substantially as herein shown and described.

2. The employment of match-plates C D for molding the screws and the cores and flanges of bung-bushes concentrically in two half-flasks, substantially as herein shown and described.

JAMES MORE.

Witnesses:
JAMES T. GRAHAM,
T. B. MOSHER.